US012780398B2

(12) United States Patent
Borumand et al.

(10) Patent No.: US 12,780,398 B2
(45) Date of Patent: Nov. 3, 2026

(54) PANELS FOR AIRCRAFT FUSELAGES, AIRCRAFT ASSEMBLIES, AND METHODS FOR PANELS AND AIRCRAFT ASSEMBLIES

(71) Applicant: The Boeing Company, Arlington, VA (US)

(72) Inventors: Khashayar Borumand, Woodinville, WA (US); Alex M. Martinez, Lynwood, WA (US); James D. Whitt, Renton, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/987,446

(22) Filed: Dec. 19, 2024

(65) Prior Publication Data

US 2026/0175962 A1 Jun. 25, 2026

(51) Int. Cl.
*B64C 1/40* (2006.01)
*B64C 1/00* (2006.01)

(52) U.S. Cl.
CPC ........ *B64C 1/40* (2013.01); *B64C 2001/0072* (2013.01)

(58) Field of Classification Search
CPC . B64C 1/066; B64C 1/067; B64C 1/40; E04F 13/0876; E04F 13/0878; E04C 2002/004
See application file for complete search history.

(56) References Cited

U.S. PATENT DOCUMENTS 5,472,760 A * 12/1995 Norvell .................. B61D 17/18 244/119
7,578,468 B2 * 8/2009 Drost ...................... B64C 1/066 244/119
8,016,241 B2 * 9/2011 Moores ...................... B64C 1/40 244/119
8,899,519 B2 * 12/2014 Smith ...................... B64C 1/403 52/404.1
9,073,622 B2 * 7/2015 Heurtaux .................. B64C 1/40
9,109,353 B1 * 8/2015 Switzer ...................... E04B 2/30
(Continued)

FOREIGN PATENT DOCUMENTS

DE 202021001782 U1 * 5/2021 ............... B64C 1/40
FR 3061130 A1 * 6/2018 ............... B64C 1/40
(Continued)

*Primary Examiner* — Joseph W Sanderson
(74) *Attorney, Agent, or Firm* — Kolitch Romano Dascenzo Gates LLP

(57) ABSTRACT

A panel comprises a panel interior surface, a foam layer, and a composite layer. A first end of the panel is oriented at a first end angle relative to a foam layer interior surface, wherein the first end angle is not 90 degrees. A foam layer interior surface is operatively arranged at the panel interior surface. The composite layer comprises a composite layer interior surface operatively engaged with the foam layer exterior surface. An aircraft assembly comprises a fuselage and at least a first panel and a second panel. A first end angle of a first panel first end corresponds to a second end angle of a second panel second end, and the first panel first end operatively engages the second panel second end. A method comprising operatively engaging a first panel interior surface of a first panel with a fuselage exterior surface of a fuselage.

20 Claims, 6 Drawing Sheets

(56) References Cited

U.S. PATENT DOCUMENTS 9,211,945 B2 * 12/2015 Redecker ................ B64C 1/067
9,453,346 B2 * 9/2016 Yau ................... E04F 15/02044
9,688,383 B2 6/2017 Smith
10,023,286 B2 * 7/2018 Dickson .................. B64C 1/403
10,814,954 B2 * 10/2020 Zaman ...................... B64C 1/40
11,987,038 B2 * 5/2024 Troclet .................... B32B 5/245
12,180,702 B2 * 12/2024 O'Meara ................... B32B 3/06
12,246,817 B2 * 3/2025 Gross ...................... B64C 1/066
12,441,454 B2 * 10/2025 Bellanger ................. B32B 5/18
2005/0005544 A1 * 1/2005 Borowiecki ............ B64C 1/066 52/204.5
2006/0145006 A1 * 7/2006 Drost ...................... B64C 1/066 244/118.5
2009/0032640 A1 * 2/2009 Moores ..................... B64C 1/40 52/404.1
2012/0234979 A1 * 9/2012 Smith ....................... B64F 5/10 105/396
2013/0045352 A1 * 2/2013 Kern ........................ D04H 5/12 156/324
2013/0299630 A1 * 11/2013 Redecker .................. B64C 1/40 244/1 N
2014/0134389 A1 * 5/2014 Humfeldt .................. B64C 1/40 428/138
2014/0202789 A1 * 7/2014 Heurtaux .................. B64C 1/40 428/58
2015/0284964 A1 * 10/2015 Yau ........................... E04C 2/12 144/354
2016/0176498 A1 * 6/2016 Smith ..................... B64C 1/403 244/119
2017/0144743 A1 * 5/2017 Dickson .................... B64C 1/40
2018/0201359 A1 * 7/2018 Zaman .................... B64C 1/067
2021/0221491 A1 * 7/2021 Crall .......................... F02C 7/36
2021/0268767 A1 * 9/2021 Troclet ................. G10K 11/168
2022/0136236 A1 * 5/2022 O'Meara ................... B32B 3/06 52/232
2023/0166829 A1 * 6/2023 Bellanger ............... B32B 5/028 244/121
2023/0406475 A1 * 12/2023 Gross ...................... B64C 1/066

FOREIGN PATENT DOCUMENTS

WO WO-2017220931 A1 * 12/2017 ............ F16B 5/0642
WO WO-2022214816 A1 * 10/2022 ............. E04B 1/762

* cited by examiner

PANELS FOR AIRCRAFT FUSELAGES, AIRCRAFT ASSEMBLIES, AND METHODS FOR PANELS AND AIRCRAFT ASSEMBLIES

FIELD

The present disclosure relates to an insulative panel for an aircraft fuselage, aircraft assemblies, and methods comprising one or more of an insulative panel and an aircraft assembly.

BACKGROUND

Aircraft utilize fuselage insulation for several functions such as to reduce noise entering the passenger compartment and to reduce heat escaping the passenger compartment. Fuselage insulation also is used to manage condensation within an aircraft, sometimes referred to as "rain in the plane." When an aircraft is at altitude, the exterior surface of the aircraft is significantly colder than the interior of the passenger compartment. Thus, humidity in the air from the passenger compartment can condense near exterior surfaces of the aircraft and potentially leak back into the passenger compartment. Furthermore, moisture buildup can cause problems such as electrical issues, increased weight, corrosion of materials, and biological growth such as mold.

SUMMARY

Insulative panels, aircraft assemblies, and methods are disclosed. In some examples, a panel comprises a panel interior surface, a foam layer, and a composite layer. The foam layer comprises a first end, a foam layer interior surface, and a foam layer exterior surface opposite the foam layer interior surface. The first end of the panel is oriented at a first end angle relative to the foam layer interior surface, wherein the first end angle is not 90 degrees. The foam layer interior surface is operatively arranged at the panel interior surface. The composite layer comprises a composite layer interior surface operatively engaged with the foam layer exterior surface.

Further examples include an aircraft assembly. An aircraft assembly comprises a fuselage and at least a first panel and a second panel. The first panel comprises a first panel first end oriented at a first end angle relative to the foam layer interior surface, wherein the first end angle is not 90 degrees. The second panel comprises a second panel second end oriented at a second end angle relative to the second panel interior surface. The first end angle corresponds to the second end angle, and the first panel first end operatively engages the second panel second end.

Further examples include a method comprising operatively engaging a first panel interior surface of a first panel with a fuselage exterior surface of a fuselage, wherein the first panel comprises a first panel foam layer and a first panel composite layer.

DESCRIPTION

Insulative panels for aircraft, assemblies comprising insulative panels, and methods for insulative panels are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
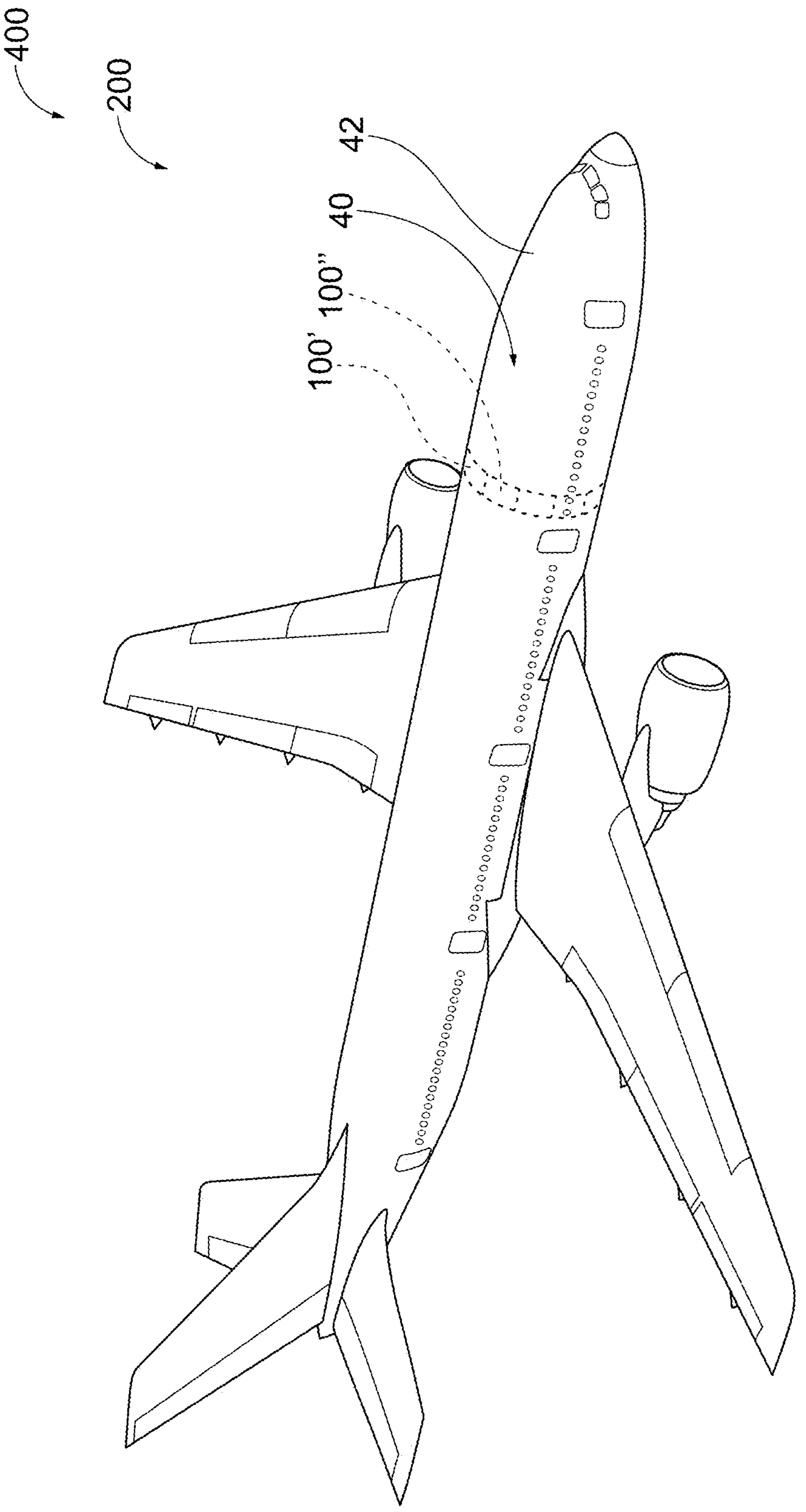
FIG. 1 is a perspective view of an example of aircraft 400 comprising panels 100' and 100".
Figure 2:
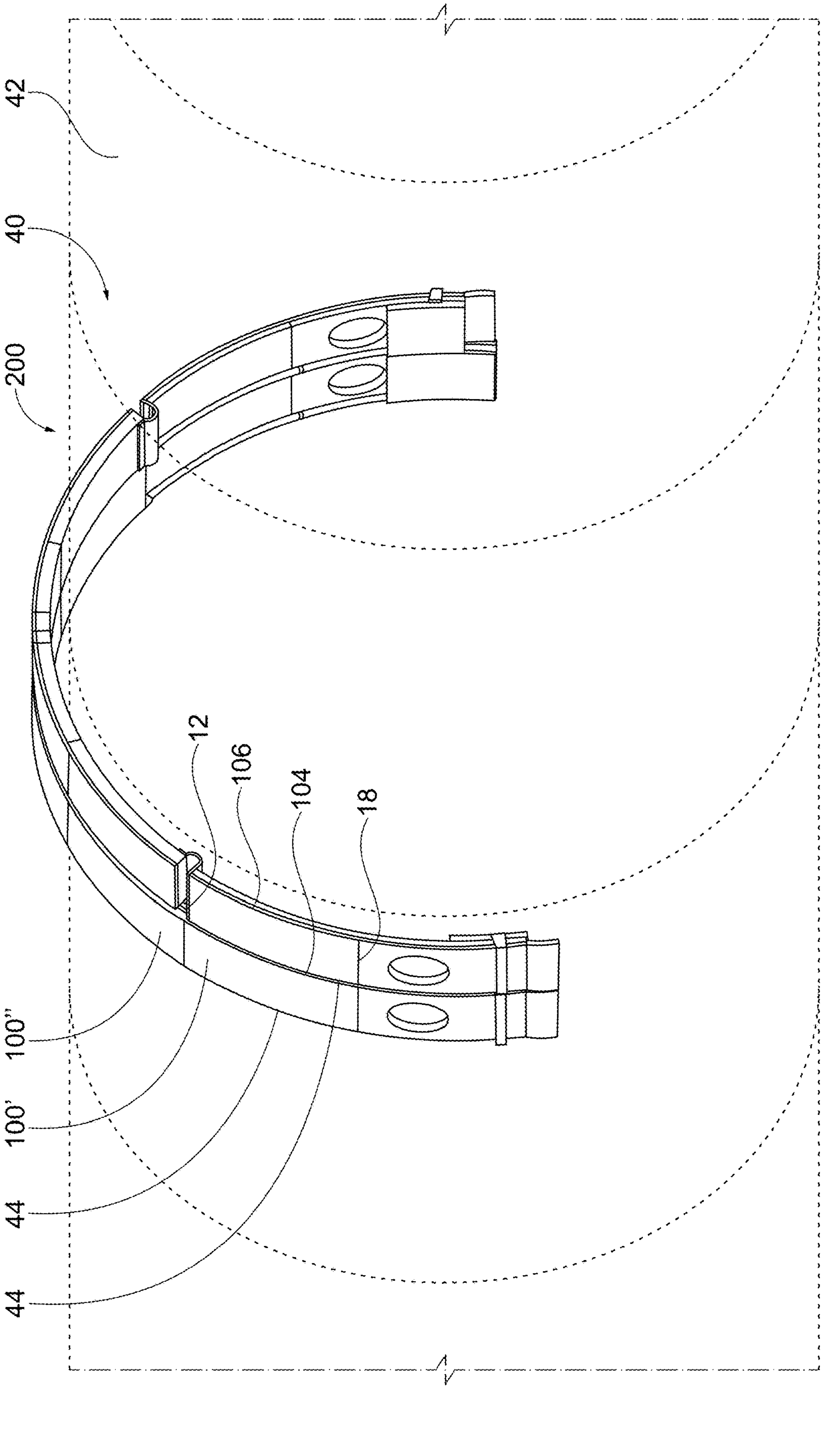
FIG. 2 is a perspective view of an example of an aircraft assembly 200 comprising panels 100' and 100"

Insulative panels are used with fuselages of aircraft. Insulative panels are arranged around the fuselage and provide functions such as moisture management, thermal insulation, and sound insulation. FIG. 1 depicts an exemplary aircraft 400 comprising a fuselage 40 and insulative panels 100' and 100" arranged circumferentially around fuselage 40. FIG. 2 further depicts insulative panels 100' and 100" arranged in a partial circumference extending around fuselage 40.

Figure 3:
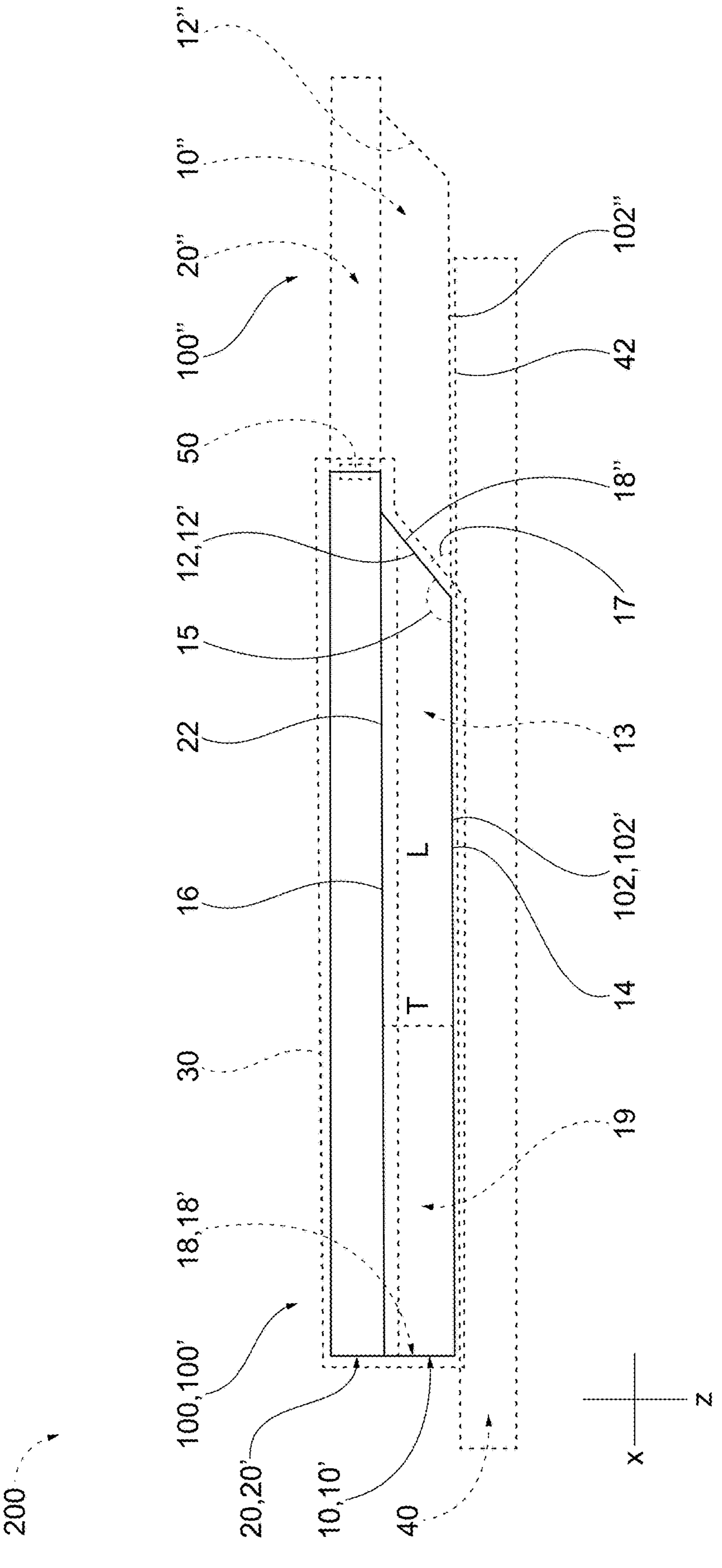
FIG. 3 is a schematic cross-sectional diagram representing an example of a panel 100 and optionally a second panel 100" and a fuselage 40.

FIG. 3 schematically depicts an example of an insulative panel 100 for an aircraft fuselage. The depicted insulative panel 100 comprises a panel interior surface 102, a foam layer 10, and a composite layer 20. Foam layer 10 comprises a first end 12, a foam layer interior surface 14, and a foam layer exterior surface 16 opposite the foam layer interior surface 14. First end 12 of the insulative panel 100 is oriented at a first end angle 15 relative to the foam layer interior surface 14, and the first end angle 15 is not 90 degrees. The foam layer interior surface 14 is operatively arranged at the panel interior surface 102. Composite layer 20 comprises a composite layer interior surface 22 operatively engaged with the foam layer exterior surface 16.

Insulative panel 100, which also may be referred to as panel 100, can reduce noise entering the passenger compartment and reduce heat exiting the passenger compartment. Panel 100 can also manage condensation by reducing airflow from the passenger compartment to exterior surfaces, providing thermal insulation, preventing moisture buildup in porous materials, and directing moisture away from sensitive areas. Examples of composite layer 20 and foam layer 10 of panel 100 contribute to the insulative properties of panel 100.

Some composite materials have insulative properties. For example, fiber glass can have a thermal insulation R-Value of greater than 30 and a Noise Reduction Coefficient (NRC) of greater than 0.95.

The composition of composite layer 20 influences the insulative and moisture management properties of panel 100. In one example, composite layer 20 comprises fiber glass. In a further example, composite layer 20 is comprised of one or more of polyvinyl fluoride (PVF), polyether ether ketone (PEEK), polyetherketoneketone (PEKK), ethylene chlorotrifluoroethylene (ECTF), and metalized PVF, PEEK, PEKK, ECTFE. In a further example, composite layer 20 comprises multiple layers of composite material, and a still further example of composite layer 20 comprises one or more films.

The films, layers, and/or coatings of composite layer 20 may protect the composite layer 20 from moisture. For example, composite layer 20 may comprise a hydrophobic or waterproof barrier layer which protects interior composite material from moisture. A barrier layer may be comprised of a film such as plastic or a treatment to the composite material.

Figure 5:
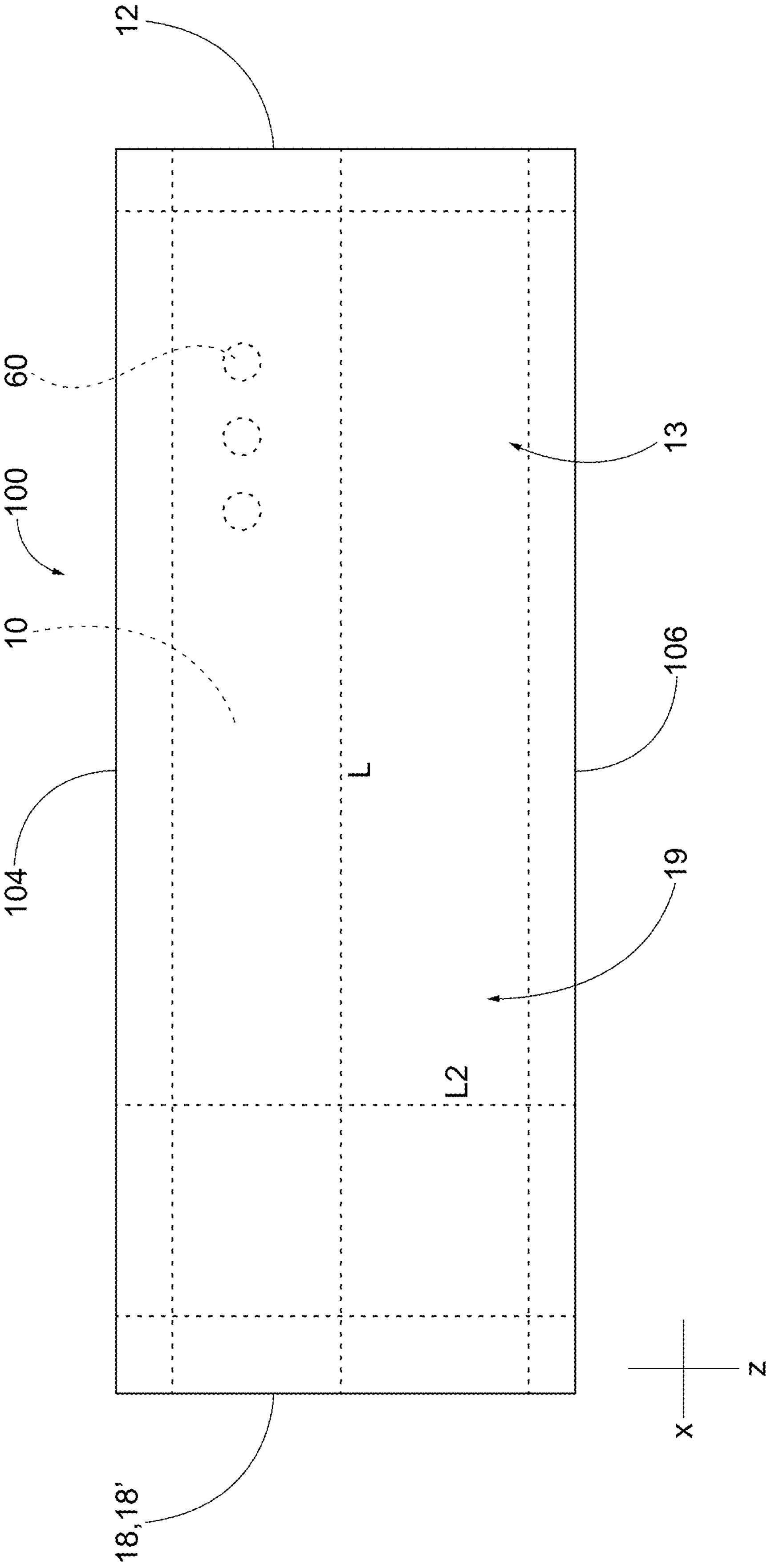
FIG. 5 is a schematic diagram representing an example of a top or bottom view of a panel 100.

Further examples of composite layer 20 may be formed as a sheet or panel. Composite layer 20 may have a similar shape to panel 100. Panel 100 has a length in the direction of a longitudinal axis (L), a width in a direction of a lateral axis (L2), and a thickness in the direction of a transverse axis (T), as shown in FIGS. 3 and 5. Examples of composite layer 20 have a length in the direction of the longitudinal axis (L) of panel 100, a width in a direction of the lateral axis (L2) of panel 100, and a thickness in a direction of the transverse axis (T) of panel 100.

Composition and configuration of composite layer 20 can be varied based on an application of a panel 100. For example, a composite layer 20 of a panel 100 designed for high altitude aircraft may have a greater thickness and employ a composite material with a greater R-value than a composite layer 20 of a panel 100 designed for lower altitude. Similarly, a composite layer 20 of a panel 100 arranged on a ceiling of an aircraft may comprise hydrophobic barriers or treatments whereas a composite layer 20 of a panel 100 positioned on a side of an aircraft may not utilize hydrophobic barriers or treatments.

Foam layer 10 also influences the thermal insulation, acoustic insulation, and moisture management properties of a panel 100. For example, melamine foams have R-values greater than 10, an NRC of 0.7 to 0.95, fire resistant properties, and are lightweight. Further examples of foams have inherent moisture resistant properties or can be treated with moisture resistant additives, coatings, or layers.

Furthermore, foam layer 10 can contribute stiffness properties to a panel 100. For example, composite materials such as fiberglass may bend or droop during installation or use, whereas foams may maintain their shape. In other words, examples of foams have a higher stiffness than examples of composite materials. The stiffness properties of foam layer 10 also may allow for formation of structural features such as angled ends that could not be produced with some examples of composite materials.

The composition of foam layer 10 influences the insulative and moisture management properties of panel 100. Examples of foam layer 10 comprise melamine foam. Further examples of foam layer 10 are comprised of one or more of polyimide, polyurethane, polyisocyanurate, phenolic compounds, polyolefin, high-density polyethylene (HDPE), low-density polyethylene (LDPE), polyvinylidene fluoride (PVDF), and polyethylene (PE). The composition of foam layer 10 can be tailored to needs of a specific application of a panel 100. For example, a foam layer 10 of a panel 100 arranged near engines of an aircraft may be comprised of a foam with greater acoustic insulation properties than a foam layer 10 of a panel 100 arranged near the ceiling of the aircraft.

Furthermore, foam layer 10 may comprise treatments or additives. Examples of foam layer 10 comprise a hydrophobic treatment. Hydrophobic treatments may reduce or prevent moisture buildup within foam layer 10 and/or panel 100 and reduce or prevent moisture from traveling through panel 100. Further examples of foam layer 10 comprises a flame-retardant treatment.

Examples of foam layer 10 further vary in physical properties such as thickness and density. In one example, foam layer 10 comprises a first side 13 having a first thickness and a second side 19 opposite first side 13 having a second thickness. In a further example, foam layer 10 has a thickness (T) of 25-105 millimeters (mm). Foam layers 10 and panels 100 having a greater thickness may provide greater insulative properties than panels with a lower thickness.

In further examples, foam layer 10 varies in density. For example, first side 13 of foam layer 10 has a first density and second side 19 of foam layer 10 has a second density that is higher than the first density. Variation in density of foam layer 10 may be due to the composition of foam layer 10 or the configuration of foam layer 10. FIG. 5 depicts an example of foam layer 10 comprising recesses 60 and first side 13 of foam layer 10 comprising recesses 60 and second side 19 of foam layer 10 is free of or does not comprise recesses. Recesses of foam layer 10 vary in configuration. In some examples, recesses are open to an exterior surface of foam layer 10, and in other examples, the recesses are covered by a skin or a layer.

Figure 4:
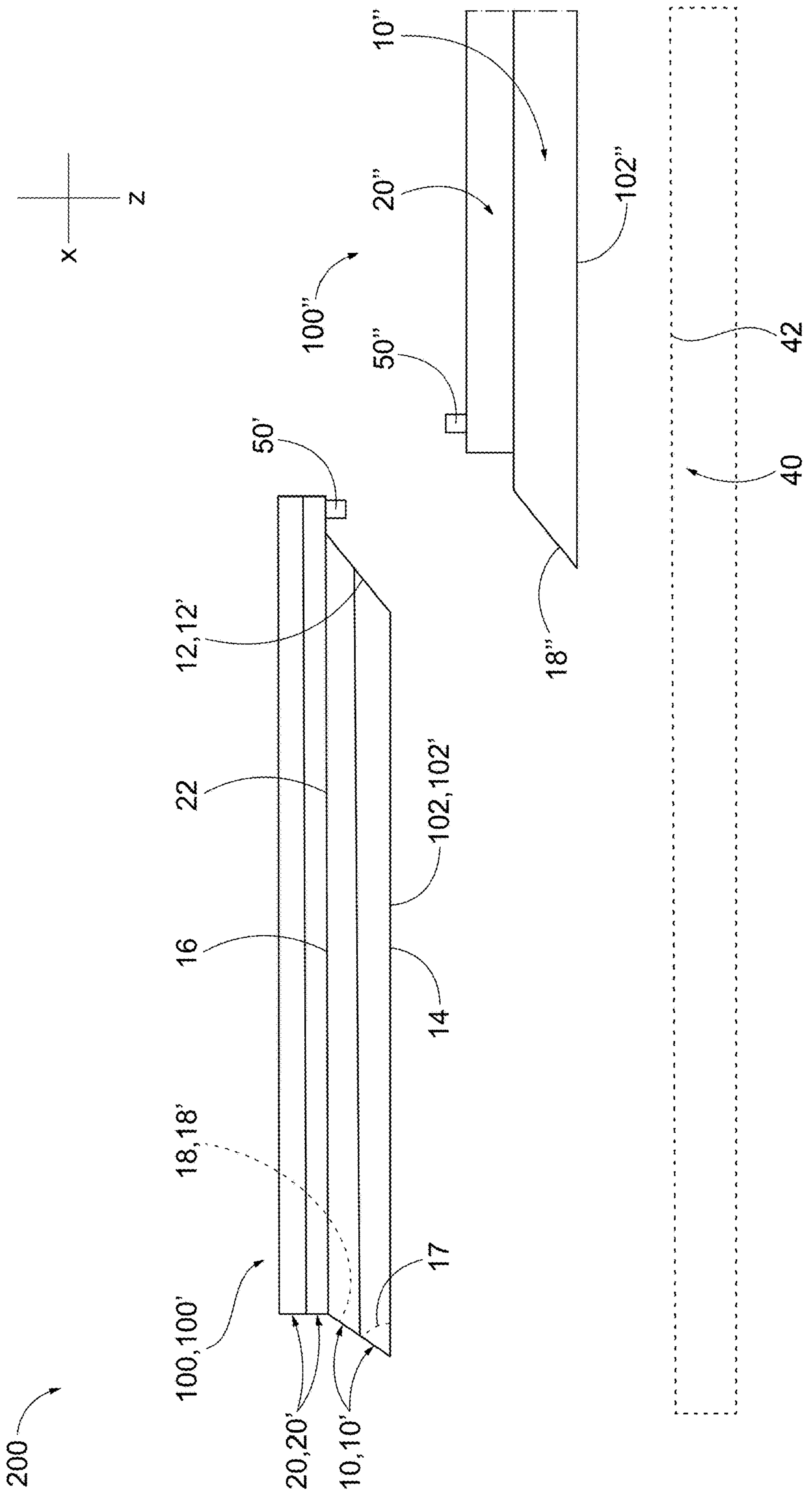
FIG. 4 is schematic exploded diagram representing an example of a first panel 100', a second panel 100" and a fuselage 40.

FIG. 4 depicts an example of foam layer 10 comprising multiple layers of foam. Multiple layers of foam may allow for further tailoring of a panel 100 based on a specific application. For example, a panel 100 having a greater number of layers may have greater insulative properties than a panel 100 with fewer layers. Layers of foam layer 10 may also vary in properties. For example, an exterior layer of foam layer 10 may have a hydrophobic coating, whereas an interior layer of foam layer 10 may not have a hydrophobic coating. Similarly, an interior layer of foam layer 10 may have recesses whereas, an exterior layer of foam layer 10 may be free of recesses.

Foam layer 10 further has stiffness properties. In one example, foam layer 10 has a foam layer stiffness and the composite layer 20 has a composite layer stiffness, and the foam layer stiffness is greater than the composite layer stiffness. Examples of foam layer 10 and panel 100 may also be described as self-supporting or maintaining shape. The self-supporting properties of foam layer 10 and panel 100 are related to properties of density and specific stiffness. Many foams have low densities, and low density is desirable in aircraft applications. Examples of foam layer 10 and panel 100 have a density within a range of 0.15-1.15 pound per cubic foot (lb/ft$^3$). Further examples of foam layer 10 and panel 100 have densities in a range of 0.25-0.7 lb/ft$^3$, 0.32-0.4 lb/ft$^3$, 0.5-0.7 lb/ft$^3$, and 0.25-0.32 lb/ft$^3$. The examples of foam layer 10 and panel 100 with the densities described above have specific stiffness of 0.005-140 GPa/(g/cc). Further examples of low modulus foams have a specific stiffness in a range of 0.005-0.0155 GPa/(g/cc) and examples of high modulus foams have a specific stiffness in a range of 50-140 GPa/(g/cc). The combination of relatively low densities and high specific stiffness of the examples of foam layer 10 and panel 100 allow for the foam layer 10 and panel 100 to be self-supporting.

The stiffness properties of foam layer 10 may reduce difficulties in installing and maintaining panels 100. For example, conventional insulative blankets are known to sag during installation on a fuselage, thus making it difficult to maintain arrangement of the insulative blankets. Similarly, insulative blankets may sag during use, thus creating maintenance difficulties. Furthermore, insulative blankets may absorb moisture during use which can exacerbate sagging of the insulative blankets.

FIGS. 3 and 4 depict examples of foam layer 10 comprising angled ends. As described above, examples of first end 12 of panel 100 are oriented at a first end angle 15 (that is not 90 degrees) relative to the foam layer interior surface 14. Examples of first end angle 15 of first end 12 are formed by foam layer 10. In further examples, a second end 18 of panel 100 comprises a second end angle 17 relative to the foam layer interior surface 14, and the second end angle 17 is not 90 degrees. Examples of second end angle 17 of second end 18 are formed by foam layer 10.

Examples of first end angle 15 and second end angle 17 are in a range of 35-75 degrees or 125 165 degrees. Furthermore, as will be discussed in further detail below, first end angle 15 of a first panel 100' may correspond to second end angle 17 of a second panel 100". For example, a first end angle 15 may be 45 degrees, while a second end angle 17 may be 135 degrees. FIG. 3 depicts an example of corresponding first end angle 15 and second end angle 17. Corresponding end angles may allow for panels 100' and 100" to be fit together, as depicted by first end 12' and second end 18" in FIG. 3. Thus, multiple panels, such as first panel 100' and second panel 100", may be arranged on a fuselage 40 to form an aircraft assembly 200.

FIGS. 1-4 depict examples of aircraft assemblies 200 including a fuselage 40 comprising a fuselage exterior surface 42 and at least one panel 100 comprising a panel interior surface 102 operatively engaged with the fuselage exterior surface 42. In another example of an aircraft assembly 200, fuselage 40 has curvature, and panel 100 conforms to the curvature of fuselage 40 during installation.

Further examples of aircraft assemblies 200 comprise multiple panels 100. FIG. 3 depicts an example of an aircraft assembly 200 comprising a fuselage 40 and at least a first panel 100' and a second panel 100". First panel 100' comprises a first panel foam layer 10', a first panel composite layer 20', and a first panel interior surface 102' operatively engaged with the fuselage exterior surface 42. The first panel foam layer 10' comprises a first panel first end 12', a first panel second end 18', a foam layer interior surface 14, and a foam layer exterior surface 16 opposite the foam layer interior surface 14. The foam layer interior surface 14 is operatively arranged at the first panel interior surface 102'. The first panel composite layer 20' comprises a composite layer interior surface 22 operatively engaged with the foam layer exterior surface 16. The first panel first end 12' is oriented at a first end angle 15 relative to the foam layer interior surface 14.

In the example depicted in FIG. 3, the second panel 100" comprises a second panel composite layer 20", a second panel foam layer 10", and a second panel interior surface 102" operatively engaged with fuselage exterior surface 42. The second panel foam layer 10" comprises a second panel first end 12" and a second panel second end 18". The second panel second end 18" is oriented at a second end angle 17 relative to the second panel interior surface 102".

FIG. 3 further depicts first panel first end 12' operatively engaging second panel second end 18" and first end angle 15 corresponding to second end angle 17. Thus, first panel 100' and second panel 100" form an insulative layer around fuselage 40. Further panels 100 can be added to create a partial circumference around a fuselage 40.

FIGS. 1 and 2 depict examples of aircraft assemblies 200 comprising panels first panel 100' and second panel 100" arranged on a fuselage 40. FIG. 4 depicts an exploded view of an example of first panel 100' and second panel 100" separated so that features such as first end 12 and second end 18 are readily visible. FIGS. 1, 2, 4, and 5 depict illustrative non-exclusive examples of aircraft assemblies 200 and panels 100. Where appropriate, the reference numerals from the schematic illustration of FIG. 3 are used to designate corresponding parts of the examples of FIGS. 1, 2, 4, and 5; however, the examples of FIGS. 1, 2, 4, and 5 are non-exclusive and do not limit aircraft assemblies 200 and panels 100 to the illustrated embodiments of FIGS. 1, 2, 4, and 5. That is, aircraft assemblies 200 and panels 100 are not limited to the specific embodiments of FIGS. 1, 2, 4, and 5, and aircraft assemblies 200 and panels 100 may incorporate any number of the various aspects, configurations, characteristics, properties, etc. of aircraft assemblies 200 and panels 100 that are illustrated in and discussed with reference to the schematic representations of FIG. 3 and/or the embodiments of FIGS. 1, 2, 4, and 5, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 1, 2, 4, and 5; however, it is within the scope of the present disclosure that the previously discussed features, variants, etc. may be utilized with the examples of FIGS. 1, 2, 4, and 5.

Panels 100 comprising engaging ends such as first end 12 and second end 18 allow for panels 100 to be assembled together to form an insulative layer around a fuselage 40. FIG. 1 depicts first panel 100' and second panel 100" extending circumferentially around fuselage 40. FIG. 2 depicts a plurality of panels, including first panel 100' and second panel 100", forming two partial circumferences around fuselage 40.

FIG. 2 further depicts frames 44 which extend circumferentially around fuselage 40 and engage panels such as first panel 100' and second panel 100". In an example of an assembled state, frame 44 engages a first lateral end 104 and a second lateral end 106 of first panel 100' and second panel 100". Therefore, in some examples, each of each of first end 12, second end 18, first lateral end 104, and second lateral end 106 are engaged with frames 44 or another panel 100. In other words, all four sides of a respective panel 100 are supported.

Furthermore, the panels 100 may press or snap into a position on the fuselage 40 due to a stiffness of foam layer 10 and the angled ends of panel 100. In one example, fuselage 40 comprises frames 44 operatively arranged on fuselage exterior surface 42 and panel 100 is press-fit into frames 44 such that first lateral end 104 and second lateral end 106 of panel 100 operatively engage with frames 44. In a further example, first lateral end 104 and second lateral end 106 are oriented at an angle to the panel interior surface 102. Thus, one or more of first end 12, second end 18, first lateral end 104, and second lateral end 106 of panels 100 may contribute to reduced time needed for assembly of an insulative layer around a fuselage 40.

The ability of the panels 100 to be press fit into position on the fuselage 40 corresponds to indentation force-deflection properties of the foam material. Indentation force-deflection (IFD) is measured in pounds or newtons and is a measure of the amount of force required for an indenter to achieve 25% indentation in a 50 in sample that has been through a warm-up procedure. Full details of the testing can be found in ASTM standard D3574. A higher IFD value corresponds to higher force required to indent the foam sample. Examples of panels 100 have IFD values of 30-100 lbs and 40-50 lbs.

Engagement of the angled ends of panel 100, such as first end 12 and second end 18, also may provide a secure fit between panels. The engagement of the angled ends may also reduce passage of moisture through panels 100. For example, FIG. 3 depicts first panel foam layer 10' having a transverse axis (T) extending between foam layer interior surface 14 and foam layer exterior surface 16. FIG. 3 further depicts first panel first end 12' and second panel second end 18" overlapping in the transverse direction (T). This overlap of first end 12 and second end 18 may reduce moisture passing through the gap between first panel 100' and second panel 100". The overlap between the angled ends may create a tortious, twisted, or winding path which reduces diffusion of moisture across the insulative layer.

In further examples, composite layer 20 of panels 100 may also form overlap between panels 100 and reduce diffusion of moisture across the insulative layer. For example, FIG. 3 depicts first panel composite layer 20' extending onto the second panel 100". The overlap of the composite layer 20' onto second panel 100" creates a further tortious, twisted, or winding path in addition to the overlap of first end 12 and second end 18. In a further example, the first panel first end 12' extends past a portion of the second panel second end 18" in the direction of the longitudinal axis L of the first panel foam layer 10'. In further examples, first panel composite layer 20' may extend onto second panel composite layer 20" such that an interior surface of first panel composite layer 20' is operatively arranged on an exterior surface of second panel composite layer 20".

Examples of panels 100 comprise fasteners 50 arranged on composite layers 20. Examples of fasteners 50 engage when a first end 12 of a first panel 100' and second end 18 of second panel 100" are engaged. In other words, examples of fasteners 50 engage to help hold multiple panels 100 together. For example, a first fastener 50' is operatively arranged on the first panel 100' and a second fastener 50" is operatively arranged on the second panel 100". In further examples, first fastener 50' is operatively arranged on first panel composite layer 20' and second fastener 50" is operatively arranged on second panel composite layer 20". In the example depicted in FIG. 4, first fastener 50' is operatively arranged on an interior surface of the first panel composite layer 20' and the second fastener 50" is operatively arranged on an exterior surface of the second panel composite layer 20". In examples where a composite layer 20 extends onto another panel 100, this extension can serve as a mounting point for a fastener 50 as shown in FIG. 4.

In other examples, fasteners 50 are arranged on other surfaces such as longitudinal ends of composite layer 20, as depicted in FIG. 3. Examples of fasteners 50 may comprise hook and loop, adhesive, snaps, hooks, extruded mushroom head fasteners, press-studs, and self-interlocking.

As described above, examples of an aircraft assembly 200 comprise two or more panels including at least first panel 100' and second panel 100" operatively arranged end-to-end to extend in a circumferential direction around fuselage 40. Multiple panels 100 allow for the panels to vary in characteristics and properties. FIG. 4 depicts an example of a first panel composite layer 20' comprising multiple layers of composite material and a second panel composite layer 20" comprising only one layer of composite material. In a similar example, a first panel composite layer 20' has a first density and a second panel composite layer 20" has a second density which is greater than the first density.

Examples of foam layer 10 also vary characteristics and properties between different panels 100. In one example, a first panel foam layer 10' has a first thickness and a second panel foam layer 10" has a second thickness which is greater than the first thickness. In a further example, second panel 100" is arranged on a sidewall of fuselage 40 and the second thickness is in the range of 95-110 millimeters.

As described above, variation in panels 100 of an aircraft assembly 200 allows for properties of a respective panel 100 to correspond to a specific location on the fuselage. For example, a first panel 100' is arranged near an engine while a second panel 100" is arranged near a ceiling of the fuselage. In this example, first panel 100' may have greater acoustic insulation properties while second panel 100" may have a hydrophobic treatment.

Examples of panels 100 are also enclosed in a protective barrier. A protective barrier may prevent or reduce moisture ingress into panels 100. A protective barrier may also prevent or reduce moisture from passing through panels 100 or moving between interior sides and exterior sides of panels 100. FIG. 3 depicts an example of a panel 100 comprising an enclosure 30 surrounding the foam layer 10 and the composite layer 20. In a further example, the enclosure 30 is a plastic film. In still further examples, enclosure 30 comprises a waterproof or hydrophobic material.

Figure 6:
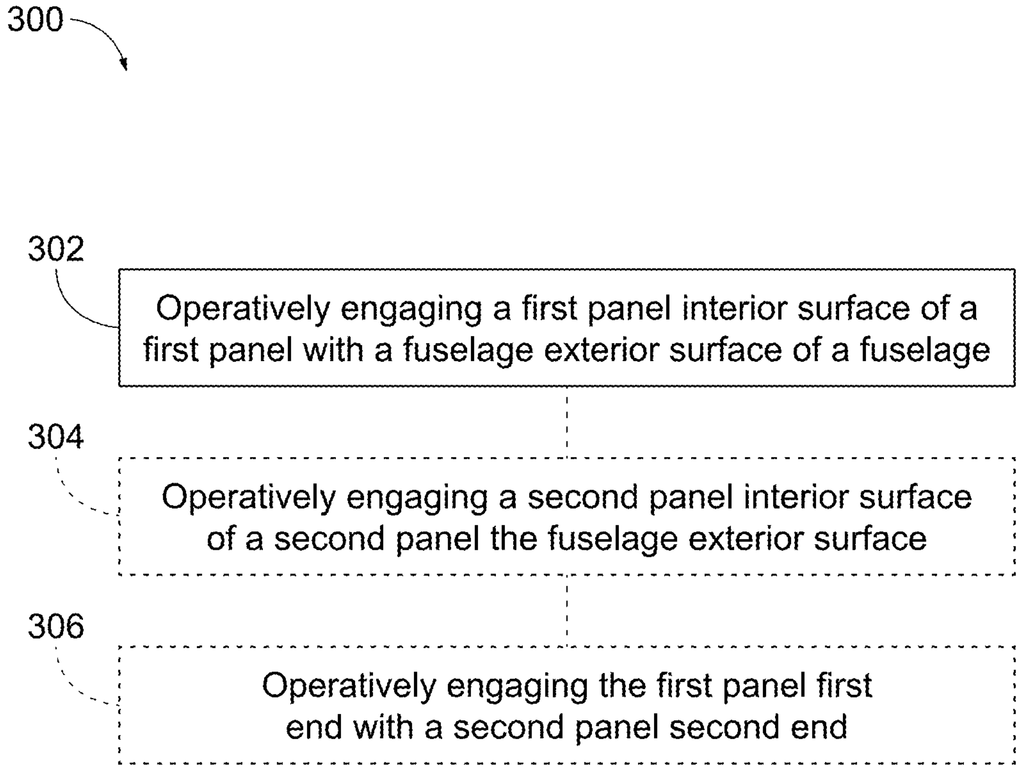
FIG. 6 is a flowchart schematically representing an example of a method 300 for a panel 100.

Methods for panels 100 and aircraft assemblies 200 are disclosed. FIG. 6 schematically provides a flowchart that represents illustrative, non-exclusive examples of methods according to the present disclosure. In FIG. 6, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 6 are not limiting and other methods and steps are within the scope of the present disclosure, including methods having greater than or fewer than the number of steps illustrated, as understood from the discussions herein.

FIG. 6 depicts an example of method 300 comprising operatively engaging 302 a first panel interior surface 102' of a first panel 100' with a fuselage exterior surface 42 of a fuselage 40, wherein first panel 100' comprises a first panel foam layer 10' and a first panel composite layer 20'. FIGS. 1-3 each show examples of first panel 100' engaging with fuselage exterior surface 42 of fuselage 40. Engaging a panel 100 with an exterior surface 42 of a fuselage 40 forms an insulative layer on the fuselage 40.

In further examples, the method 300 comprises operatively engaging 304 a second panel interior surface 102" of a second panel 100" with fuselage exterior surface 42 and operatively engaging 306 first panel first end 12' with a second panel second end 18". FIGS. 1-3 each show examples of second panel 100" engaging with fuselage exterior surface 42 of fuselage 40 and FIG. 3 depicts first panel first end 12' engaged with a second panel second end 18". As discussed above, examples of first panel first end 12' and second panel second 18" are angled relative to respective panel interior surfaces 102 and foam layer interior surfaces 14. Furthermore, first end angle 15 of first panel first end 12' corresponds to second end angle 17 of second panel second end 18". Engaging first end angle 15 and second end angle 17 may improve security of a fit between first panel 100' and second panel 100" as well as fit between panels 100' and 100" and fuselage 40. Engaging first end angle 15 and second end angle 17 may further reduce manufacturing difficulties by reducing or preventing panels 100 from moving from an installed position.

In a further example, fuselage exterior surface 42 has a curvature, as depicted in FIGS. 1 and 2, and first panel 100' is planar prior to operatively engaging fuselage exterior surface 42. First panel 100' conforms to the curvature of fuselage exterior surface 42 when first panel 100' is operatively engaged to fuselage exterior surface 42. In other words, panels 100 may be planar prior to installation but conform to a curvature of fuselage 40 when installed.

Examples of method 300 further comprise press-fitting first panel 100' into frames 44 of fuselage 40 to operatively engage a first lateral end 104 and a second lateral end 106 of first panel 100' with the frames 44. Engagement of first lateral end 104 and second lateral end 106 with the frames 44 may further improve security of a fit between panels 100' and 100" and fuselage 40 and further reduce manufacturing difficulties by reducing or preventing panels 100 from moving from an installed position.

Illustrative, non-exclusive examples of inventive subject matter according to the present disclosure are described in the following enumerated paragraphs:

A. An insulative panel (100) for a fuselage (40) of an aircraft, the panel (100) comprising:

a panel interior surface (102);

a foam layer (10) comprising a first end (12), a foam layer interior surface (14), and a foam layer exterior surface (16) opposite the foam layer interior surface (14), wherein the foam layer interior surface (14) is operatively arranged at the panel interior surface (102); and a composite layer (20) comprising a composite layer interior surface (22) operatively engaged with the foam layer exterior surface (16); wherein the first end (12) of the foam layer (10) is oriented at a first end angle (15) relative to the foam layer interior surface (14), wherein the first end angle (15) is not 90 degrees.

A1. The panel (100) of paragraph A, wherein the foam layer (10) comprises a hydrophobic treatment.

A2. The panel (100) of any of paragraphs A-A1, wherein the foam layer (10) comprises a flame-retardant treatment.

A3. The panel (100) of any of paragraphs A-A2, wherein the foam layer (10) further comprises a first side (13) and a second side (19) opposite the first side (13), wherein the first side (13) has a first density and the second side (19) has a second density that is higher than the first density.

A4. The panel (100) of any of paragraphs A-A3, wherein the foam layer (10) further comprises a/the first side (13) and a/the second side (19) opposite the first side (13), wherein the first side (13) has a first thickness and the second side (19) has a second thickness that is greater than the first thickness.

A5. The panel (100) of any of paragraphs A-A4, wherein the foam layer (10) further comprises a/the first side (13) and a/the second side (19) opposite the first side (13), wherein the first side (13) comprises recesses and the second side (19) is free of recesses.

A6. The panel (100) of any of paragraphs A-A5, wherein the foam layer (10) further comprises a second end (18), wherein the second end (18) comprises a second end angle (17) relative to the foam layer interior surface (14), wherein the second end angle (17) is not 90 degrees.

A6.1. The panel (100) of paragraph A6, wherein the second end angle (17) is between 35 and 75 degrees.

A7. The panel (100) of any of paragraphs A-A6.1, wherein the foam layer (10) comprises recesses.

A8. The panel (100) of any of paragraphs A-A7, wherein the foam layer (10) comprises multiple layers of foam.

A9. The panel (100) of any of paragraphs A-A8, wherein the foam layer (10) has a thickness (T) of 25-105 millimeters.

A10. The panel (100) of any of paragraphs A-A9, wherein the foam layer (10) comprises melamine foam.

A11. The panel (100) of any of paragraphs A-A10, wherein the foam layer (10) has a foam layer stiffness and the composite layer (20) has a composite layer stiffness, and wherein the foam layer stiffness is greater than the composite layer stiffness.

A12. The panel (100) of any of paragraphs A-A11, wherein the foam layer (10) is comprised of one or more of polyimide, polyurethane, polyisocyanurate, phenolic compounds, polyolefin, high-density polyethylene, low-density polythene, polyvinylidene fluoride, and polythene.

A13. The panel (100) of any of paragraphs A-A12, wherein the composite layer (20) comprises fiber glass.

A14. The panel (100) of any of paragraphs A-A13, wherein the composite layer (20) comprises one or more films, and the one or more films are comprised of one or more of polyvinyl fluoride (PVF), polyether ether ketone (PEEK), polyetherketoneketone (PEKK), ethylene chlorotrifluoroethylene (ECTF), and metalized PVF, PEEK, PEKK, ECTFE.

A15. The panel (100) of any of paragraphs A-A14, wherein the composite layer (20) comprises multiple layers of composite material.

A16. The panel (100) of any of paragraphs A-A15, wherein the panel (100) further comprises an enclosure (30) surrounding the foam layer (10) and the composite layer (20).

A16.1.The panel (100) of paragraph A16, wherein the enclosure (30) is a plastic film.

A17. The panel (100) of any of paragraphs A-A16.1, wherein the first end angle (15) is in a range of 35-75 degrees or 125-165 degrees.

B. An aircraft assembly (200) comprising:

a fuselage (40) comprising a fuselage exterior surface (42);

a panel (100) comprising:

a panel interior surface (102) operatively engaged with the fuselage exterior surface (42);

a foam layer (10) comprising a first end (12), a foam layer interior surface (14), and a foam layer exterior surface (16) opposite the foam layer interior surface (14), wherein the foam layer interior surface (14) is operatively arranged at the panel interior surface (102); and a composite layer (20) comprising a composite layer interior surface (22) operatively engaged with the foam layer exterior surface (16);

wherein the first end (12) of the foam layer (10) is oriented at a first end angle (15) relative to the foam layer interior surface (14), wherein the first end angle (15) is not 90 degrees.

B1. The aircraft assembly (200) of paragraph B, wherein the fuselage (40) comprises frames (44) operatively arranged on the fuselage exterior surface (42), wherein the panel (100) has a first lateral end (104) and a second lateral end (106), and wherein the panel (100) is press-fit into the frames (44), and the first lateral end (104) and the second lateral end (106) operatively engage with the frames (44).

B1.1. The aircraft assembly (200) of paragraph B1, wherein the first lateral end (104) and the second lateral end (106) are oriented at an angle to the panel interior surface (102), and wherein the first lateral end (104) and the second lateral end (106) operatively engage the frames (44).

B2. The aircraft assembly (200) of any of paragraphs B-B1.1, wherein the fuselage (40) has a curvature, and wherein the panel (100) conforms to the curvature of the fuselage (40) during installation.

C. An aircraft assembly (200) comprising:
 a fuselage (40) comprising a fuselage exterior surface (42);
 two or more panels (100) comprising at least a first panel (100') and a second panel (100"):
 the first panel (100') comprising:
  a first panel interior surface (102') operatively engaged with the fuselage exterior surface (42);
  a first panel foam layer (10') comprising a first panel first end (12'), a first panel second end (18'), a foam layer interior surface (14), and a foam layer exterior surface (16) opposite the foam layer interior surface (14), wherein the foam layer interior surface (14) is operatively arranged at the first panel interior surface (102'); and a first panel composite layer (20') comprising a composite layer interior surface (22) operatively engaged with the foam layer exterior surface (16);
  wherein the first panel first end (12') is oriented at a first end angle (15) relative to the foam layer interior surface (14), wherein the first end angle (15) is not 90 degrees,
 the second panel (100") comprising:
  a second panel interior surface (102") operatively engaged with fuselage exterior surface (42);
  a second panel composite layer (20"); and
  a second panel foam layer (10") comprising a second panel first end (12") and a second panel second end (18"), wherein the second panel second end (18") is oriented at a second end angle (17) relative to the second panel interior surface (102"), wherein the first end angle (15) corresponds to the second end angle (17), and wherein the first panel first end (12') operatively engages the second panel second end (18").

C1. The aircraft assembly (200) of paragraph C, wherein the first panel foam layer (10') has a transverse axis (T) extending between the foam layer interior surface (14) and the foam layer exterior surface (16), wherein the first panel first end (12') and the second panel second end (18") overlap in a direction of the transverse axis (T).

C2. The aircraft assembly (200) of any of paragraphs C-C1, wherein the first panel foam layer (10') has a longitudinal axis (L) extending from the first panel first end (12') to the second panel second end (18"), and wherein the first panel first end (12') extends past a portion of the second panel second end (18") in the direction of the longitudinal axis (L).

C3. The aircraft assembly (200) of any of paragraphs C-C2, wherein a first fastener (50') is operatively arranged on the first panel (100') and a second fastener (50") is operatively arranged on the second panel (100").

C3.1. The aircraft assembly (200) of paragraph C3, wherein the first fastener (50') is operatively arranged on the first panel composite layer (20') and the second fastener (50") is operatively arranged on the second panel composite layer (20").

C3.2 The aircraft assembly (200) of paragraph C3, wherein the first fastener (50') is operatively arranged on an interior surface of the first panel composite layer (20') and the second fastener (50") is operatively arranged on an exterior surface of the second panel composite layer (20").

C4. The aircraft assembly (200) of any of paragraphs C-C3.2, wherein the two or more panels (100) comprising at least the first panel (100') and the second panel (100") are operatively arranged end-to-end to extend circumferentially around the fuselage (40).

C5. The aircraft assembly (200) of any of paragraphs C-C4, wherein the first panel composite layer (20') extends onto the second panel (100")

C6. The aircraft assembly (200) of any of paragraphs C-C5, wherein first panel composite layer (20') comprises multiple layers of composite material and the second panel composite layer (20") comprises only one layer of composite material.

C7. The aircraft assembly (200) of any of paragraphs C-C6, wherein the first panel foam layer (10') has a first thickness and the second panel foam layer (10") has a second thickness which is greater than the first thickness.

C7.1. The aircraft assembly (200) of paragraph C7, wherein the second panel (100") is arranged on a sidewall of the fuselage (40) and the second thickness is in the range of 95-110 millimeters.

C8. The aircraft assembly (200) of any of paragraphs C-C7.1, wherein the first panel composite layer (20') has a first density and the second panel composite layer (20") has a second density which is greater than the first density.

D. A method (300) comprising:
 operatively engaging (302) a first panel interior surface (102') of a first panel (100') with a fuselage exterior surface (42) of a fuselage (40), wherein the first panel (100') comprises:
  a first panel foam layer (10') comprising a first panel first end (12'), a first panel second end (18'), a foam layer interior surface (14), and a foam layer exterior surface (16) opposite the foam layer interior surface (14), wherein the foam layer interior surface (14) is operatively arranged at the first panel interior surface (102'); and
  a first panel composite layer (20') comprising a composite layer interior surface (22) operatively engaged with the foam layer exterior surface (16);
  wherein the first panel first end (12') is oriented at a first end angle (15) relative to the foam layer interior surface (14), wherein the first end angle (15) is not 90 degrees.

D1. The method (300) of paragraph D, further comprising operatively engaging (304) a second panel interior surface (102") of a second panel (100") with the fuselage exterior surface (42), and
 operatively engaging (306) the first panel first end (12') with a second panel second end (18"), wherein the second panel second end (18") is oriented at a second end angle (17) relative to the second panel interior surface (102"), and wherein the first end angle (15) corresponds to the second end angle (17).

D2. The method (300) of any of paragraphs D-D1, wherein the fuselage exterior surface (42) has a curvature, and wherein first panel (100') is planar prior to operatively engaging the fuselage exterior surface (42), and the first panel (100') conforms to the curvature of the fuselage exterior surface (42) when the first panel (100') is operatively engaged to the fuselage exterior surface (42).

D3. The method (300) of any of paragraphs D-D2, wherein operatively engaging (302) the first panel interior surface (102') with the fuselage exterior surface (42) comprises press-fitting the first panel (100') into frames (44) of the fuselage (40) to operatively engage a first lateral end (104) and a second lateral end (106) of first panel (100') with the frames (44).

E. Use of an insulative panel (100) on an aircraft fuselage (40), the panel (100) comprising:

a panel interior surface (102);

a foam layer (10) comprising a first end (12), a foam layer interior surface (14), and a foam layer exterior surface (16) opposite the foam layer interior surface (14), wherein the foam layer interior surface (14) is operatively arranged at the panel interior surface (102); and a composite layer (20) comprising a composite layer interior surface (22) operatively engaged with the foam layer exterior surface (16);

wherein the first end (12) of the foam layer (10) is oriented at a first end angle (15) relative to the foam layer interior surface (14), wherein the first end angle (15) is not 90 degrees.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft assembly comprising:

a fuselage comprising frames extending in a circumferential orientation around the fuselage;

an insulative panel for an aircraft fuselage, the panel comprising:

a first lateral end and a second lateral end, wherein the panel is press-fit into the frames, and the first lateral end and the second lateral end operatively engage with the frames;

a foam layer comprising a first end, a foam layer interior surface, and a foam layer exterior surface opposite the foam layer interior surface; and a composite layer comprising a composite layer interior surface operatively engaged with the foam layer exterior surface;

wherein the foam layer has a foam layer stiffness and the composite layer has a composite layer stiffness, and wherein the foam layer stiffness is greater than the composite layer stiffness, wherein the foam layer is self-supporting, wherein the first end of the foam layer is oriented at a first end angle relative to the foam layer interior surface, wherein the first end angle is not 90 degrees.

2. The aircraft assembly of claim 1, wherein the foam layer further comprises a first side and a second side opposite the first side, wherein the first side comprises recesses and the second side is free of recesses.

3. The aircraft assembly of claim 1, wherein the foam layer further comprises a second end, wherein the second end comprises a second end angle relative to the foam layer interior surface, wherein the second end angle is not 90 degrees, and wherein the second end angle is between 35 and 75 degrees.

4. The aircraft assembly of claim 1, wherein the panel further comprises an enclosure surrounding the foam layer and the composite layer.

5. The aircraft assembly of claim 1, wherein the first end angle is in a range of 35-75 degrees or 125-165 degrees.

6. An aircraft assembly comprising:

a fuselage comprising frames extending in a circumferential orientation around the fuselage;

two or more panels comprising at least a first panel and a second panel;

the first panel comprising:

a first lateral end and a second lateral end, wherein the first panel is press-fit into the frames, and the first lateral end and the second lateral end operatively engage with the frames;

a first panel interior surface;

a first panel foam layer comprising a first panel first end, a first panel second end, a foam layer interior surface, and a foam layer exterior surface opposite the foam layer interior surface; and a first panel composite layer comprising a composite layer interior surface operatively engaged with the foam layer exterior surface;

wherein the first panel foam layer has a foam layer stiffness and the first panel composite layer has a composite layer stiffness, and wherein the foam layer stiffness is greater than the composite layer stiffness, wherein the first panel foam layer is self-supporting;

wherein the first panel first end is oriented at a first end angle relative to the foam layer interior surface, wherein the first end angle is not 90 degrees;

the second panel comprising:

a second panel interior surface;

a second panel composite layer; and a second panel foam layer comprising a second panel first end and a second panel second end, wherein the second panel second end is oriented at a second end angle relative to the second panel interior surface, wherein the first end angle corresponds to the second end angle, and wherein the first panel first end operatively engages the second panel second end.

7. The aircraft assembly of claim 6, wherein the first lateral end and the second lateral end are oriented at an angle relative to the first panel interior surface.

8. The aircraft assembly of claim 6, wherein the fuselage has a curvature, and wherein the first panel conforms to the curvature of the fuselage during installation.

9. The aircraft assembly of claim 6, wherein the first panel foam layer has a transverse axis extending between the foam layer interior surface and the foam layer exterior surface, wherein the first panel first end and the second panel second end overlap in a direction of the transverse axis.

10. The aircraft assembly of claim 6, wherein the first panel foam layer has a longitudinal axis extending from the first panel first end to the first panel second end, and wherein the first panel first end extends past a portion of the second panel second end in a direction of the longitudinal axis.

11. The aircraft assembly of claim 6, wherein a first fastener is operatively arranged on the first panel, and a second fastener is operatively arranged on the second panel.

12. The aircraft assembly of claim 6, wherein the two or more panels comprising at least the first panel and the second panel are operatively arranged end-to-end to extend circumferentially around the fuselage.

13. The aircraft assembly of claim 6, wherein the first panel composite layer extends onto the second panel.

14. The aircraft assembly of claim 6, wherein the first panel foam layer comprises melamine foam.

15. A method comprising:

operatively engaging a first panel with frames of a fuselage, wherein operatively engaging the first panel with the frames of the fuselage comprises press-fitting the first panel into frames of the fuselage to operatively engage a first lateral end and a second lateral end of first panel with the frames, wherein the frames extend in a circumferential orientation around the fuselage, wherein the first panel comprises:

a first panel foam layer comprising a first panel first end, a first panel second end, a foam layer interior surface, and a foam layer exterior surface opposite the foam layer interior surface; and a first panel composite layer comprising a composite layer interior surface operatively engaged with the foam layer exterior surface;

wherein the first panel foam layer has a foam layer stiffness and the first panel composite layer has a composite layer stiffness, and wherein the foam layer stiffness is greater than the composite layer stiffness, wherein the first panel foam layer is self-supporting;

wherein the first panel first end is oriented at a first end angle relative to the foam layer interior surface, wherein the first end angle is not 90 degrees.

16. The method of claim 15, further comprising operatively engaging the first panel first end with a second panel second end, wherein the second panel second end is oriented at a second end angle relative to a second panel interior surface, and wherein the first end angle corresponds to the second end angle.

17. The method of claim 15, wherein the fuselage has a curvature, wherein the first panel is planar prior to operatively engaging the frames of the fuselage, and wherein the first panel conforms to the curvature of the fuselage when the first panel is operatively engaged with the frames of the fuselage.

18. The aircraft assembly of claim 1, wherein the first lateral end and the second lateral end are oriented at an angle relative to a first panel interior surface.

19. The aircraft assembly of claim 1, wherein the fuselage has a curvature, and wherein the panel conforms to the curvature of the fuselage during installation.

20. The method of claim 15, wherein the first lateral end and the second lateral end are oriented at an angle relative to a first panel interior surface.

* * * * *